United States Patent
Fried et al.

(10) Patent No.: US 6,911,761 B2
(45) Date of Patent: Jun. 28, 2005

(54) HORIZONTAL-AXIS ELECTRICAL MACHINE

(75) Inventors: Not-Curdin Fried, Windisch (CH); Daniel Hediger, Othmarsingen (CH); Nicola Merlini, Minusio (CH); René Meylan, Yverdon-les-Bains (CH); Francesco Stallone, Locarno (CH)

(73) Assignee: Alstom Technology Ltd., Baden (CH)

( * ) Notice: Subject to any disclaimer, the term of this patent is extended or adjusted under 35 U.S.C. 154(b) by 0 days.

(21) Appl. No.: 10/871,168

(22) Filed: Jun. 17, 2004

(65) Prior Publication Data

US 2004/0256946 A1 Dec. 23, 2004

(30) Foreign Application Priority Data

Jun. 17, 2003 (DE) .......................................... 103 27 508

(51) Int. Cl.⁷ ............................ H02K 1/18; H02K 5/24
(52) U.S. Cl. ......................................... 310/258; 310/51
(58) Field of Search ................................. 310/217, 254, 310/258, 91, 89, 51; 29/546

(56) References Cited

U.S. PATENT DOCUMENTS

| | | | | |
|---|---|---|---|---|
| 2,456,612 A | * | 12/1948 | Baudry | 310/254 |
| 3,805,102 A | * | 4/1974 | Vockler | 310/91 |
| 4,207,484 A | * | 6/1980 | Krecker | 310/91 |
| 4,425,523 A | * | 1/1984 | Detinko et al. | 310/258 |
| 4,469,973 A | * | 9/1984 | Guyot et al. | 310/258 |
| 4,663,553 A | * | 5/1987 | Zimmermann | 310/258 |
| 5,442,249 A | * | 8/1995 | Zimmermann | 310/91 |
| 6,091,177 A | * | 7/2000 | Carbonell et al. | 310/91 |
| 6,455,977 B2 | * | 9/2002 | Leyvraz et al. | 310/254 |
| 2003/0222530 A1 | * | 12/2003 | Hediger et al. | 310/217 |

FOREIGN PATENT DOCUMENTS

| | | | |
|---|---|---|---|
| CH | 665507 | 5/1988 | |
| DE | 4322268 | 1/1995 | |
| DE | 1083647 | * 8/2000 | ............ H02K/5/04 |
| GB | 1416371 | 12/1975 | |

* cited by examiner

Primary Examiner—Darren Schuberg
Assistant Examiner—Heba Elkassabgi
(74) Attorney, Agent, or Firm—Davidson, Davidson & Kappel, LLC

(57) ABSTRACT

A horizontal-axis electrical machine has an built-in stator concentrically surrounded by a number of parallel retaining rings that spaced apart from one another in the axial direction and are connected on their outer circumference on opposing sides in each case by means of retaining structures to a base frame which extends in the axial direction. A horizontally acting spring, which has the form of a perpendicular, longitudinal plate, is fixed on the one hand with its ends to the associated retaining ring, and is firmly connected on the other hand with its freely flexible central part to the base frame by means of connecting elements, being provided within each of the retaining structures. Improved oscillation isolation between the built-in stator and the base frame is achieved in such an electrical machine by vertically acting spring elements disposed between the ends of the spring and the associated retaining ring.

7 Claims, 2 Drawing Sheets

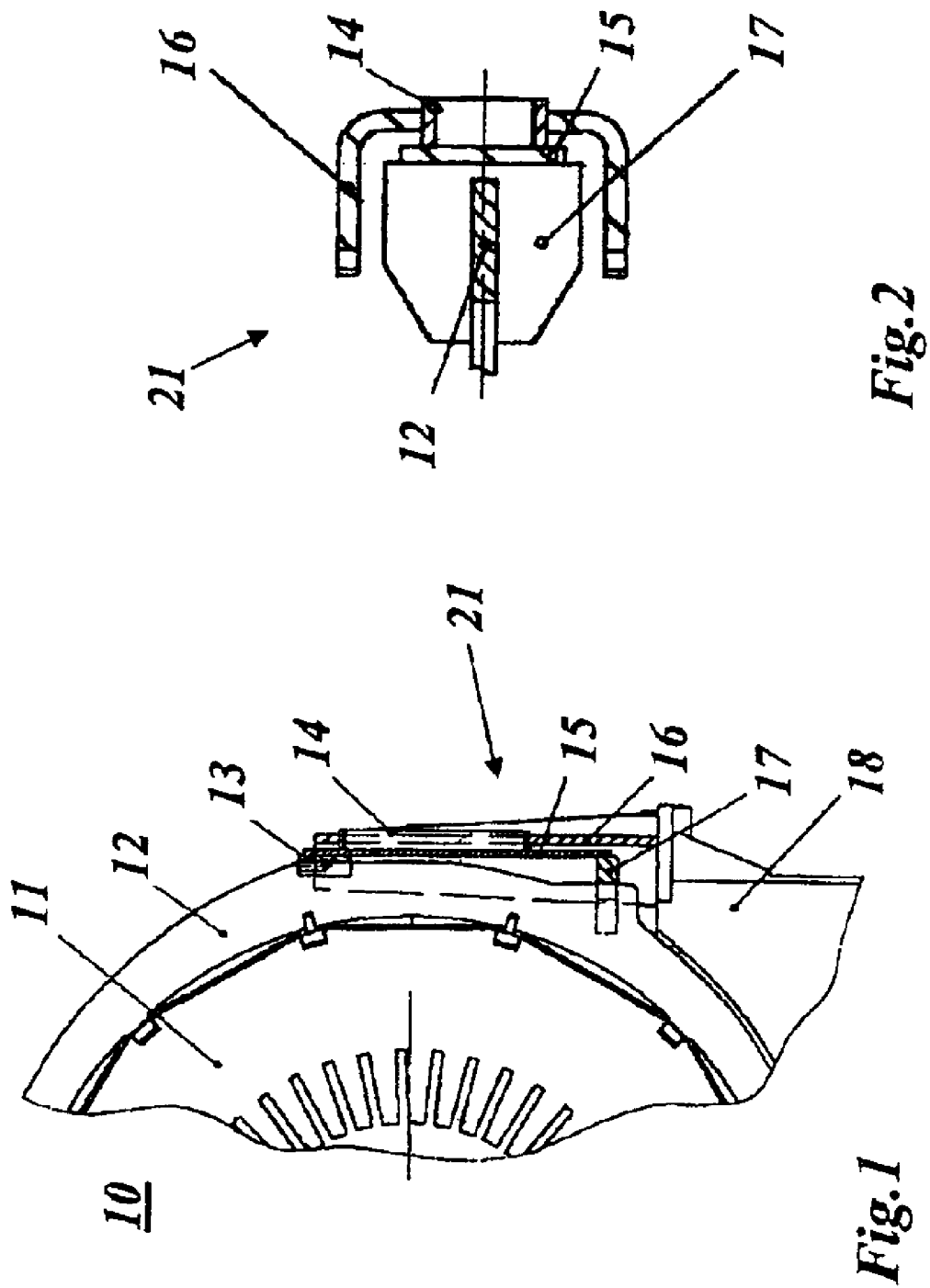

HORIZONTAL-AXIS ELECTRICAL MACHINE

Priority is claimed to German Patent Application No. DE 103 27 508.8, filed on Jun. 17, 2003, the entire disclosure of which is incorporated by reference herein.

The present invention relates generally to the field of electrical machines, and more particularly to a horizontal-axis electrical machine.

BACKGROUND

Such a machine is disclosed, for example, in German Patent Document No. DE-A1-43 22 268, related to U.S. Pat. No. 5,442,249, both of which are incorporated by reference herein.

It has long been known to mount the laminated stator part of a larger horizontal-axis electrical machine in a number of retaining rings, which are arranged one behind the other in the axial direction, are spaced apart from one another and are each fixed on two opposing sides by means of a retaining structure to the base frame or base below. A machine having such a design is disclosed, for example, in Swiss Patent Document CH-A5-665 507, related to U.S. Pat. No. 4,669,553, both of which are incorporated by reference herein. It is characterized in that any oscillations and thermal stresses are kept low during operation. The known means for fixing the laminated stator part allow for simple assembly, easy accessibility of the structural parts to be welded and ensure the good quality of the welding seams.

In the case of very large air-cooled turbogenerators, the double-frequency oscillations of the laminated core and the resulting acoustic emissions are very high. However, as the size of the machine increases, the loads on the components and on the welding seams at the points of connection to the housing also increase. The oscillations of the laminated core and thermal cycling may result in fatigue phenomena and fissuring. It is therefore proposed in the specification mentioned initially, DE-A1-43 22 268, to simply fix the laminated stator part or built-in stator with its retaining rings in the horizontal direction in a resilient manner to the base frame or housing. This is achieved by leaf springs being built-in in the laterally arranged retaining structures of the retaining rings. Both ends of the perpendicular leaf springs are welded to the retaining rings. In the freely flexible central region, the leaf springs are welded to the housing by means of a number of tubular pieces arranged one on top of the other. As a result, given high strength in the circumferential direction, the housing is isolated acoustically and in terms of oscillations from the laminated stator part, as long as the oscillation amplitudes are on a horizontal plane.

One disadvantage of the known manner of mounting the built-in stator, however, is that, when there are different types of oscillations of the built-in stator, in which vertical components occur, isolation is only effected to a limited extent.

SUMMARY OF THE INVENTION

An object of the invention to is to provide a horizontal-axis electrical machine that results in improved isolation in terms of oscillations between the built-in stator and the base frame.

The present invention provides a horizontal-axis electrical machine (10) having an built-in stator (11), which is concentrically surrounded by a number of parallel retaining rings (12) which are spaced apart from one another in the axial direction and are connected on their outer circumference on opposing sides in each case by means of retaining structures (19, 20, 21) to a base frame (18) which extends in the axial direction, a horizontally acting spring (15), which has the form of a perpendicular, longitudinal plate, is fixed on the one hand with its ends to the associated retaining ring (12), and is firmly connected on the other hand with its freely flexible central part to the base frame (18) by means of connecting elements (14, 16), being provided within each of the retaining structures (19, 20, 21), characterized in that vertically acting spring elements (13, 17) are arranged between the ends of the spring (15) and the associated retaining ring (12).

Vertically acting spring elements are provided between the ends of the spring and the associated retaining ring. The additional, vertically acting spring elements mean that even more complicated oscillations are reliably isolated. The compact arrangement of the spring and the spring elements within the retaining structures makes it possible to match and adjust the spring characteristics in a simple manner.

A first preferred refinement of the invention is characterized in that the connecting elements each comprise a u-shaped retaining element, which is positioned at right angles on the base frame, and a tubular piece, which extends horizontally between the spring and the retaining element, and in that the tubular piece is a rectangular tube.

One development of this refinement is characterized in that the tubular piece or rectangular tube is welded to the spring and the retaining element, and in that the retaining element is welded to the base frame.

A second preferred refinement of the invention is characterized in that the retaining ring, the spring elements and the spring are welded to one another.

A further advantageous refinement of the machine according to the invention is characterized in that the spring elements extend horizontally between the spring and the associated retaining ring and engage around the retaining ring on both sides.

BRIEF DESCRIPTION OF THE DRAWINGS

The invention is explained in more detail below with reference to exemplary embodiments in conjunction with the drawings, in which:

FIG. 1 shows a detail of the longitudinal section through a resilient means for fixing a retaining ring to the base frame according to a preferred exemplary embodiment of the invention;

FIG. 2 shows the cross section through the fixing means shown in FIG. 1; and

DETAILED DESCRIPTION

Figure 3:
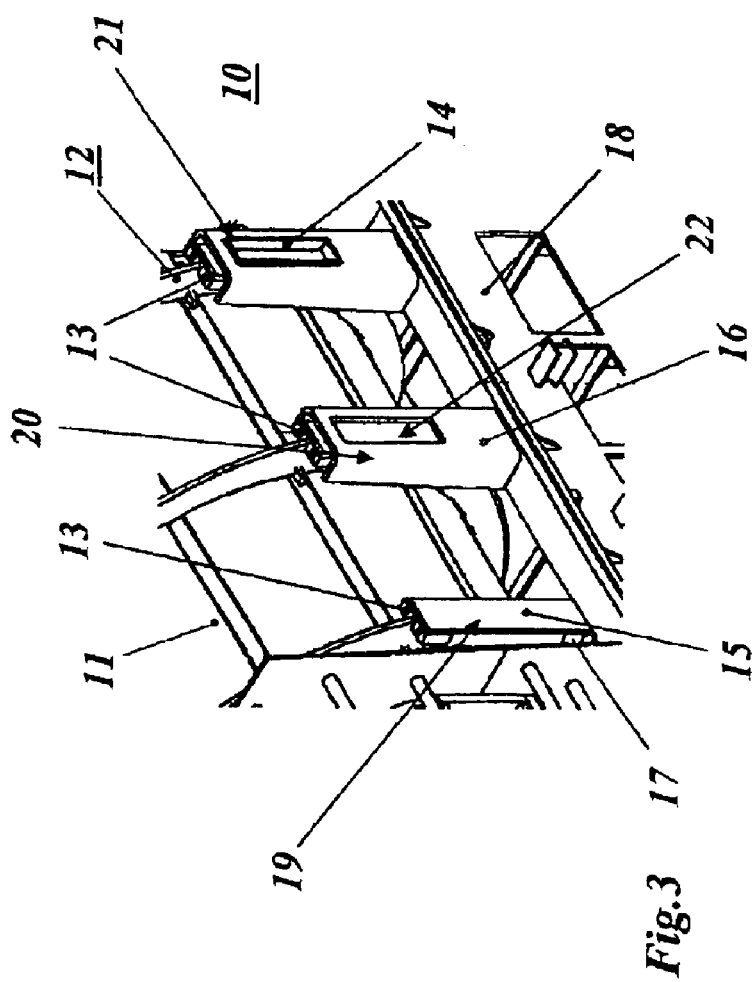
FIG. 3 shows a detail of the perspective side view of a machine having the fixing means shown in FIG. 1, different assembly steps being shown on different retaining rings for the retaining structure 19, 20 and 21.

FIG. 1 shows a detail of a horizontal-axis electrical machine 10 according to a preferred exemplary embodiment of the invention which shows the resilient means for fixing the built-in stator 11 of the machine 10 to a base frame 18 below. The laminated stator stack of the built-in stator 11 is mounted in a number of retaining rings 12 which are arranged one behind the other in the axial direction (see also FIG. 3), and which for their part are fixed to opposing sides of the base frame 18 using individual, vertical retaining structures 21 (19, 20, 21 in FIG. 3). The internal design of the retaining structures 19, 20, 21 is illustrated in longitudinal section in FIG. 1, in cross section in FIG. 2, and in different assembly steps in FIG. 3 (19→20→21).

Within the retaining structure 21 (FIGS. 1, 2), a perpendicular spring 15 is firmly connected, in the form of a longitudinal, rectangular plate, at both ends to the associated retaining ring 12 (see retaining structure 19 in FIG. 3). The connection is made by means of an upper spring element 13 and a lower spring element 17. The spring elements 13, 17 are horizontal plates which engage around the retaining ring 12 on both sides (see FIG. 2). They are welded at one end to the retaining ring 12 and at their outer end face to the spring 15. A tubular piece in the form of a rectangular tube 14, which has a longitudinal rectangular cross section, is welded to the outside of the spring 15. The tube axis of the rectangular tube 14 is in this case perpendicular to the surface of the spring 15. A retaining element 16 having a u-shaped cross-sectional profile is firmly welded to the horizontal base frame 18 such that it is positioned at right angles and such that the retaining element 16 surrounds the spring 15 on three sides, and the base plate, which forms the base of the U profile, of the retaining element 16 is parallel to the spring 15 with a clearance. A rectangular cutout 22, which matches the external dimensions of the rectangular tube 14 (see retaining structure 20 in FIG. 3), is provided in this base plate. When the retaining structure has been completely fitted (retaining structure 21 in FIG. 3), the rectangular tube 14 protrudes through the cutout 22 and is welded to the base plate. Instead of the rectangular tube 14, the connection between the spring 15 and the base plate of the retaining element 16 may also be made using a number of round tubular pieces or using a vertical, solid steel plate, as is shown in a similar manner in the DE-A1-43 22 268 patent document referred to above.

In the exemplary embodiment illustrated in FIGS. 1 to 3, the spring 15 is asymmetrical with a horizontal central plane which passes through the machine axis, i.e. the majority of the length of the spring 15 is beneath the central plane. This has the result that the two spring elements 13 and 17 have a different length and thickness. However, it is also conceivable for the spring 15 to be symmetrical with the central plane. In this case, the spring elements are largely the same.

The solution according to the invention results in the following advantages and characterizing features:

The combination of the retaining ring 12 with the spring 15 and the u-shaped retaining element 16 brings about isolation between the built-in stator 11 and the base frame 18 in the horizontal direction.

The horizontal spring elements 13, 17 bring about vertical isolation between the built-in stator 11 and the base frame 18.

The connection between the retaining element 16 and the retaining ring with the spring by means of the rectangular tube 14 ensures a rigid connection.

The vertical rigidness is influenced by the horizontal spring elements 13, 17.

The dual spring action owing to the spring 15 and the spring elements 13, 17 results in improved isolation between the four-node oscillations of the built-in stator 11 and the base frame 18.

It is possible to adjust (match) the spring characteristic in a simple manner.

It is also conceivable to use screw connections or the like in place of welded connections.

What is claimed is:

1. A horizontal-axis electrical machine comprising:

a stator;

a plurality of parallel retaining rings concentrically surrounding the stator and axially spaced from each other;

a base frame; and a plurality of retaining structures connecting an outer circumference of each of the plurality of retaining rings to the base frame at opposing sides, wherein each retaining structure includes:
a horizontally acting spring including a plate disposed perpendicular and longitudinal with respect to a respective retaining ring of the plurality of retaining rings, the plate having a first end part, a second end part and a flexible central part;
a connecting unit connecting the central part to the base frame;
a first vertically acting spring element disposed between the first end part and the respective retaining ring; and
a second vertically acting spring element disposed between the second end part and the respective retaining ring.

2. The electrical machine as recited in claim 1, wherein the connecting unit includes a u-shaped retaining element disposed at a right angle on the base frame, and a tubular piece extending horizontally between the spring and the retaining element.

3. The electrical machine as recited in claim 2, wherein the tubular piece is a rectangular tube.

4. The electrical machine as recited in claim 2, wherein the tubular piece is welded to the spring and the retaining element.

5. The electrical machine as recited in claim 4, wherein the retaining element is welded to the base frame.

6. The electrical machine as recited in claim 1, wherein the respective retaining ring, the first and second spring elements and the spring are connected to one another by welding.

7. The electrical machine as recited in claim 1, wherein the first and second spring elements extend horizontally between the spring and the respective retaining ring and engage on both sides of the respective retaining ring.

* * * * *